(12) United States Patent
Srivastava et al.

(10) Patent No.: US 7,019,452 B2
(45) Date of Patent: Mar. 28, 2006

(54) BORON-CONTAINING RED LIGHT-EMITTING PHOSPHORS AND LIGHT SOURCES INCORPORATING THE SAME

(75) Inventors: Alok Mani Srivastava, Niskayuna, NY (US); Holly Ann Comanzo, Niskayuna, NY (US); Venkatesan Manivannan, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 157 days.

(21) Appl. No.: 10/448,151

(22) Filed: May 29, 2003

(65) Prior Publication Data
US 2004/0239233 A1    Dec. 2, 2004

(51) Int. Cl.
*H01J 1/62*    (2006.01)
(52) U.S. Cl. .................. 313/467; 313/468; 313/485; 313/486; 313/487; 252/301.4 R
(58) Field of Classification Search ............... 313/467, 313/468, 485–487; 252/301.4 R
See application file for complete search history.

(56) References Cited

U.S. PATENT DOCUMENTS

| | | | | |
|---|---|---|---|---|
| 4,406,971 A | * | 9/1983 | Takano et al. | 313/461 |
| 4,946,621 A | * | 8/1990 | Fouassier et al. | 252/301.4 R |
| 5,068,568 A | * | 11/1991 | de Vrieze et al. | 313/474 |
| 5,714,836 A | * | 2/1998 | Hunt et al. | 313/487 |
| 6,045,721 A | * | 4/2000 | Zachau et al. | 252/301.4 R |

OTHER PUBLICATIONS

S. Shionoya and W. M. Yen, (ed.) S Kamiya and H. Mizuno, "Phosphor Handbook," pp. 389-432, CRC Press, Boca Raton (1999).

* cited by examiner

*Primary Examiner*—Mariceli Santiago
*Assistant Examiner*—Anthony Perry
(74) *Attorney, Agent, or Firm*—Fletcher Yoder

(57) ABSTRACT

A boron-containing phosphor comprises a material having a formula of $AD_{1-x}Eu_xB_9O_{16}$, wherein A is an element selected from the group consisting of Ba, Sr, Ca, Mg, and combinations thereof; D is at least an element selected from the group consisting of rare-earth metals other than europium; and x is in the range from about 0.005 to about 0.5. The phosphor is used in a blend with other phosphors in a light source for generating visible light with a high color rendering index.

11 Claims, 4 Drawing Sheets

BORON-CONTAINING RED LIGHT-EMITTING PHOSPHORS AND LIGHT SOURCES INCORPORATING THE SAME

This invention was first conceived or reduced to practice in the performance of work under contract DE-FC26-99FT40632 awarded by the United States Department of Energy. The United States of America may have certain rights to this invention.

BACKGROUND OF THE INVENTION

This invention relates to boron-containing red light-emitting phosphors and to light sources incorporating such phosphors.

A phosphor is a luminescent material that absorbs radiation energy in a portion of the electromagnetic spectrum and emits energy in another portion of the electromagnetic spectrum. Phosphors of one important class are crystalline inorganic compounds of high chemical purity and of controlled composition to which small quantities of other elements (called "activators") have been added to convert them into efficient fluorescent materials. With the right combination of activators and inorganic compounds, the color of the emission can be controlled. Most useful and well-known phosphors emit radiation in the visible portion of the electromagnetic spectrum in response to excitation by electromagnetic radiation outside the visible range. Well-known phosphors have been used in mercury vapor discharge lamps to convert ultraviolet ("UV") radiation emitted by the excited mercury vapor to visible light. Other phosphors are capable of emitting visible light upon being excited by electrons (used in cathode ray tubes) or X rays (for example, scintillators in X-ray detection systems).

Fluorescent lamps having high luminous output and color rendering indices ("CRI"), which are based on mercury discharge and used for illumination, typically include three phosphors that convert UV radiation of the mercury discharge into relatively narrow bands of blue, green, and red visible light, concentrated in the spectral regions where the human eye has the highest sensitivity (450, 540, and 610 nm). Europium-activated yttrium oxide ($Y_2O_3:Eu^{3+}$) has been a favorite red light-emitting phosphor, having a peak emission at about 613 nm. However, the manufacture of this phosphor requires a high-purity $Y_2O_3$ because impurities, such as iron, in $Y_2O_3$ tend to act as competing absorbing centers for the 254 nm radiation. Other red light-emitting phosphors have also been used, but each has a certain drawback. $6MgO.As_2O_5:Mn_{2+}$ and $3.5MgO0.5MgF_2.GeO_2:Mn_{4+}$ have peak emission in the deep red region at about 655 nm, reducing the luminous output of light sources using these phosphors. In addition to having an emission peak at about 630 nm, $GdMgB_5O_{10}:Ce^{3+},Mn^{2+}$ emits broadly in the wavelength range of 580–700 nm. Thus, this phosphor does not easily provide a high CRI. Similarly, $(Sr,Mg)_3(PO_4)_2:Sn^{2+}$ has an emission peak at 630 nm, and emits even more broadly than $GdMgB_5O_{10}:Ce_{3+},Mn_{2+}$, from about 540 nm to about 720 nm. A more recent addition to the red light-emitting phosphors is $YVO_4:Eu_{3+}$, which has two peaks at about 607 nm and 619 nm. However, this phosphor also has a substantial emission at about 592 nm. In addition, residual, unreacted $V_2O_5$ in this phosphor lowers its light output. Other red light-emitting phosphors, such as $GdAlO_3:Eu_{3+}$ and $Y_2O_2S:Eu_{3+}$ have been proposed for light sources. However, the long-term stability of these phosphors in a mercury discharge needs to be improved.

Therefore, there is a continued need for new red light-emitting phosphors that emits in a narrow band near 610 nm, at which the human eye is more sensitive, and that does not impose special requirements in their manufacture. It is also very desirable to use such red light-emitting phosphors to produce light sources having high CRIs.

SUMMARY OF THE INVENTION

The present invention provides boron-containing phosphors that are excitable by radiation in the ultraviolet ("UV") range (i.e., from about 200 nm to about 400 nm). The phosphors have a formula of $AD_{1-x}Eu_xB_9O_{16}$, wherein A is at least an element selected from the group consisting of Ba, Sr, Ca, Mg, and combinations thereof; D is at least a rare-earth metal other than europium (i.e., at least an element selected from the group consisting of Y, Ce, Pr, Nd, Sm, Gd, Tb, Dy, Ho, Er, Tm, Yb, and Lu); and x is in the range from about 0.005 to about 0.5.

In one aspect of the present invention, D is an element selected from the group consisting of Gd, Y, Sm, La, Lu, and combinations thereof. In another aspect of the present invention, the phosphors emit in the range of red-light wavelengths (from about 600 nm to about 700 nm). A substantial portion of the emitted light has wavelengths in the range from about 610 nm to about 625 nm.

In still another aspect of the present invention, a boron-containing phosphor is manufactured by a method that comprises: (a) mixing at least an oxygen-containing compound of at least a first element selected from the group consisting of Ba, Sr, Ca, Mg, and combinations thereof; at least an oxygen-containing compound of at least a second element selected from the group consisting of rare-earth metals other than europium; at least an oxygen-containing compound of europium; and at least an oxygen-compound of boron to form a mixture; and (b) heating the mixture in an oxygen-containing atmosphere at a temperature in a range from about 900 C to about 1400 C for a time sufficient to convert the mixture to the boron-containing phosphor.

In still another aspect of the present invention, a boron-containing phosphor is manufactured by a method that comprises: (a) providing a first solution that comprises: (1) at least a compound of at least a first element selected from the group consisting of Ba, Sr, Ca, Mg, and combinations thereof; (2) at least a compound of at least a second element selected from the group consisting of rare-earth metals other than europium; (3) at least a compound of europium; and (4) at least a compound of boron; (b) adding a second solution to the first solution to produce a precipitate comprising compounds of the first element, the second element, europium, and boron; the second solution comprising a base selected from the group consisting of ammonium hydroxide; hydroxides of at least one element selected from the group consisting of Ba, Sr, Ca, Mg, and the at least a second element of step (a)(2); organic esters of carboxylic acids; organic amines; and combinations thereof; and (c) heating the precipitate in an oxygen-containing atmosphere at a temperature in a range from about 900 C to about 1400 C for a time sufficient to convert the precipitate to the boron-containing phosphor.

In still another aspect of the present invention, a phosphor blend comprises: (a) a boron-containing, red light-emitting phosphor having a formula of $AD_{1-x}Eu_xB_9O_{16}$, wherein A is an element selected from the group consisting of Ba, Sr, Ca, Mg, and combinations thereof; D is an element selected from the group consisting of rare-earth metals other than europium; and x is in the range from about 0.005 to about 0.5; (b) a green light-emitting phosphor; and (c) a blue light-emitting phosphor.

In still another aspect of the present invention, a visible light source comprises: (a) a source of UV radiation, and (b) a boron-containing, red light-emitting phosphor having a formula of $AD_{1-x}Eu_xB_9O_{16}$, wherein A is an element selected from the group consisting of Ba, Sr, Ca, Mg, and combinations thereof; D is an element selected from the group consisting of rare-earth metals other than europium; and x is in the range from about 0.005 to about 0.5; the boron-containing, red light-emitting phosphor absorbing a portion of the UV radiation and emitting in a wavelength range of visible light.

Other features and advantages of the present invention will be apparent from a perusal of the following detailed description of the invention and the accompanying drawings in which the same numerals refer to like elements.

DETAILED DESCRIPTION OF THE INVENTION

Figure 1:
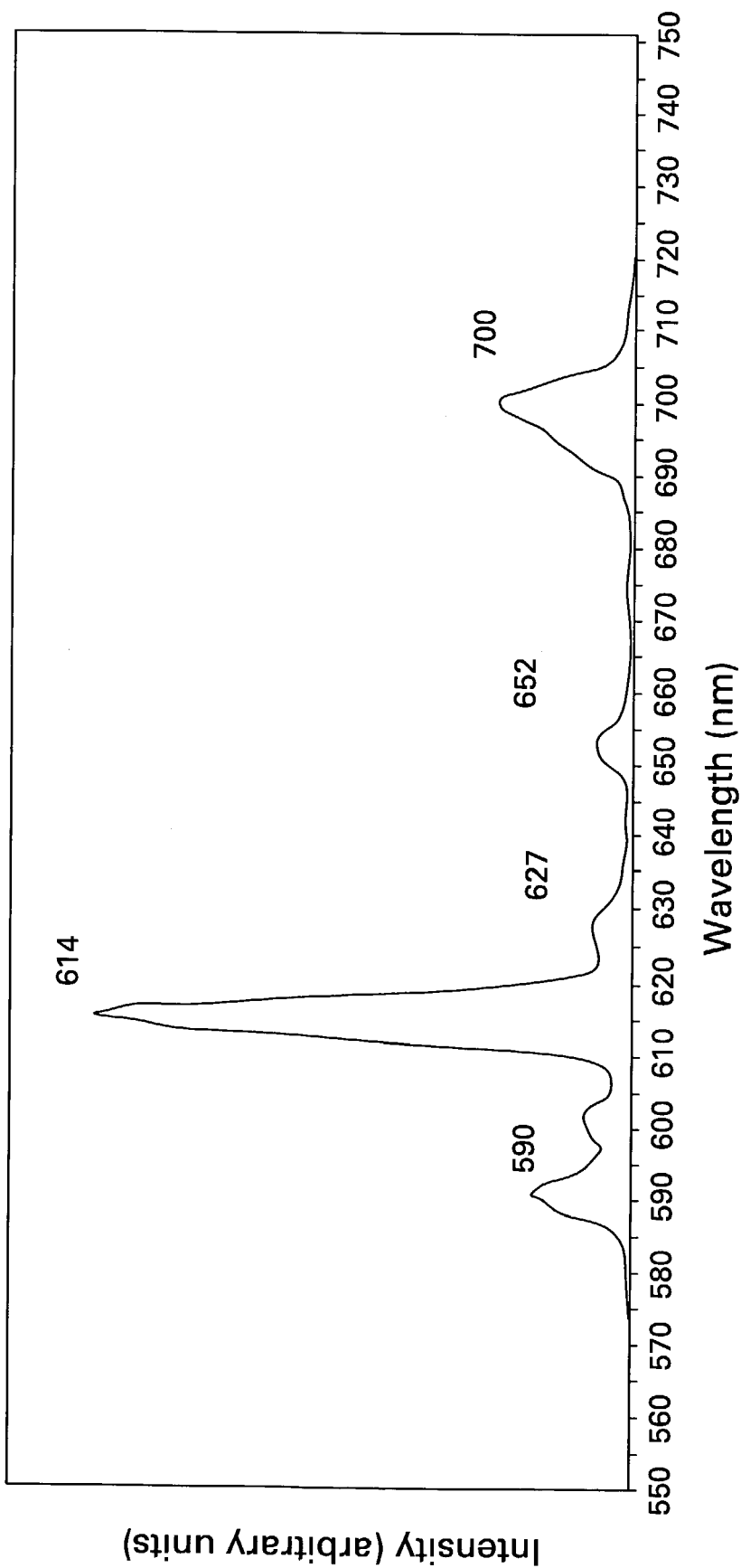
FIG. 1 shows the emission spectrum of a phosphor of the present invention, having a formula of $BaGd_{0.7}Eu_{0.3}B_9O_{16}$.

The present invention provides boron-containing phosphors that are excitable by radiation in the UV range (i.e., having wavelengths in the range from about 200 nm to about 400 nm) to emit in the red-light wavelengths (i.e., from about 600 nm to about 770 nm), preferably from about 600 nm to about 700 nm.

In one embodiment of the present invention, the phosphors emit substantially in the wavelength range from about 610 nm to about 625 nm. The greatest portion of light emitted by a phosphor of the present invention, as measured by the luminous output, has wavelengths in the range from about 600 nm to about 625 nm.

A phosphor of the present invention has a formula of $AD_{1-x}Eu_xB_9O_{16}$, wherein A is an element selected from the group consisting of Ba, Sr, Ca, Mg, and combinations thereof; D is at least a rare-earth metal other than europium; and x is in the range from about 0.005 to about 0.5. In one embodiment of the present invention D is selected from the group consisting of Y, Ce, Pr, Sm, La, Gd, Tb, and Lu. In another embodiment of the present invention, D is selected from the group consisting of Gd, Y, Sm, La, Lu, and combinations thereof.

In one embodiment of the present invention, the phosphor has a formula of $BaGd_{1-x}Eu_xB_9O_{16}$, wherein x is in the range from about 0.005 to about 0.5, preferably in the range from about 0.005 to about 0.3, and more preferably in the range from about 0.01 to about 0.3.

A phosphor of the present invention can be produced by a dry method or a wet method. The dry method comprises: (a) mixing at least an oxygen-containing compound of at least a first element selected from the group consisting of Ba, Sr, Ca, Mg, and combinations thereof; at least an oxygen-containing compound of at least a second element selected from the group consisting of rare-earth metals other than europium; at least an oxygen-containing compound of europium; and at least an oxygen-compound of boron to form a mixture; and (b) heating the mixture in an oxygen-containing atmosphere at a temperature in a range from about 900 C to about 1400 C for a time sufficient to convert the mixture to the boron-containing phosphor. A heating time in a range from about 1 minute to about 10 hours is adequate. Preferably, the temperature is in the range from about 900 C to about 1200 C. In one embodiment, the second element is selected from the group consisting of Y, Ce, Pr, Sm, La, Gd, Tb, Lu, and combinations thereof. In another embodiment, the second element is selected from the group consisting of Gd, Y, Sm, La, Lu, and combinations thereof.

The oxygen-containing compounds may be selected from the group consisting of oxides, carbonates, nitrates, sulfates, phosphates, citrates, carboxylates (salts of carboxylic acids), and combinations thereof. Lower carboxylates, such as acetates, may be desirable.

The oxygen-containing atmosphere can be air; oxygen; a mixture of oxygen and an inert gas selected from the group consisting of nitrogen, helium, argon, krypton, xenon, and combinations thereof; $NO_x$; or $SO_x$. The oxygen-containing atmosphere can comprise a gas that decomposes to give an oxygen-containing compound at the heating temperature.

In another aspect of the present invention, an amount of lithium tetraborate ($Li_2B_4O_7 5H_2O$) up to about 2 mole percent of the mixture is mixed into the mixture of the oxygen-containing compounds to act as a flux during the heating.

In still another aspect of the present invention, a flux is selected from the group consisting of fluorides of at least one element selected from the group consisting of Ba, Sr, Ca, Mg, and rare-earth metals other than europium. The flux can be added into the mixture in an amount of up to about 2 mole percent of the mixture. In one aspect of the present invention, the flux is a fluoride of an element selected from the group consisting of Ba, Sr, Ca, Mg, Gd, Y, Sm, La, Lu, and combinations thereof.

The oxygen-containing compounds may be mixed together by any mechanical method including, but not limited to, stirring or blending in a high-speed blender or a ribbon blender. The oxygen-containing compounds may be combined and pulverized together in a bowl mill, a hammer mill, or a jet mill. The mixing may be carried out by wet milling especially when the mixture of the oxygen-containing compounds is to be made into a solution for subsequent precipitation. If the mixture is wet, it may be dried first before being heated to a temperature in the range from about 900 C to about 1400 C. The drying may be carried out at ambient atmosphere or under a vacuum. The heating may be conducted in a batchwise or continuous process, preferably with a stirring or mixing action to promote good gas-solid contact. The firing time depends on the quantity of the mixture to be fired, the rate of gas conducted through the firing equipment, and the quality of the gas-solid contact in the firing equipment. Typically, a heating time from about 1 minute to about 10 hours is adequate.

EXAMPLE

The following quantities of oxygen-containing compounds were dry blended thoroughly:

$BaCO_3$ :3.104 g
$Gd_2O_3$ :1.963 g
$Eu_2O_3$ :0.817 g $H_3BO_3$ :8.630 g $Li_2B_4O_7 \cdot 5H_2O$:0.052 g The mixture was heated in air for 5 hours to produce a boron-containing red light-emitting phosphor having a formula of $BaGd_{0.7}Eu_{0.3}B_9O_{16}$, based on the amounts of the compounds used. The emission spectrum of this phosphor is shown in FIG. 1. This phosphor shows a predominant narrow emission band peaking at about 614 nm and minor emission peaks at about 590 nm, 652 nm, and 700 nm.

The wet method of preparation of a phosphor of the present invention comprises: (a) providing a first solution that comprises: (1) at least a compound of at least a first element selected from the group consisting of Ba, Sr, Ca, Mg, and combinations thereof; (2) at least a compound of at least a second element selected from the group consisting of rare-earth metals other than europium; (3) at least a compound of europium; and (4) at least a compound of boron; (b) adding a second solution to the first solution to produce a precipitate comprising compounds of the first element, the second element, europium, and boron; the second solution comprising a base selected from the group consisting of ammonium hydroxide; hydroxides of at least one element selected from the group consisting of Ba, Sr, Ca, Mg, and the rare-earth metals other than europium of step (a)(2); organic esters of carboxylic acids; organic amines; and combinations thereof; and (c) heating the precipitate in an oxygen-containing atmosphere at a temperature in a range from about 900 C to about 1400 C for a time sufficient to convert the precipitate to the boron-containing phosphor. In one embodiment, the second element is selected from the group consisting of Y, Ce, Pr, Sm, La, Gd, Th, Lu, and combinations thereof. In another embodiment, the second element is selected from the group consisting of Gd, Y, Sm, La, Lu, and combinations thereof.

In one embodiment, the first solution is simply an aqueous solution if the compounds of the first element, the second element, europium, and boron are readily dissolved in water.

In another embodiment, oxides or other oxygen-containing compounds of at least one of the first elements, at least one of the second elements, europium, and boron are dissolved in an acidic solution, such as hydrochloric acid, nitric acid, sulfuric acid, citric acid, or acetic acid. The strength of the acid solution is chosen to rapidly dissolve the oxides or the oxygen-containing compounds, and the choice is within the skill of a person skilled in the art. Ammonium hydroxide is then added in increments to the acidic solution containing the first element, the second element, europium, and boron while stirring to precipitate a mixture of hydroxides of the first element, the second element, europium, and boron. An organic base; such as methanolamine, ethanolamine, propanolamine, dimethanolamnine, diethanolamine, dipropanolamine, trimethanolamine, triethanolamine, or tripropanolamine; may be used in place of ammonium hydroxide. Alternatively, an ester of an organic acid may be used to carry out the precipitation; such as methyl, ethyl, or propyl esters of acetic acid, propionic acid, butyric acid, oxalic acid, malonic acid, succinic acid, or glutaric acid; dimethyl, diethyl, dipropyl esters of oxalic acid, malonic acid, succinic acid, or glutaric acid. The precipitate is filtered, washed with deionized water, and optionally dried. The dried precipitate is ball milled or otherwise thoroughly blended and then heated in an oxygen-containing atmosphere at a temperature in the range from about 900 C to about 1400 C, preferably from about 900 C to about 1200 C. Alternatively, the wet precipitate can be heated first, and then ball milled or otherwise thoroughly blended afterward.

White Light-Emitting Device

Figure 2:
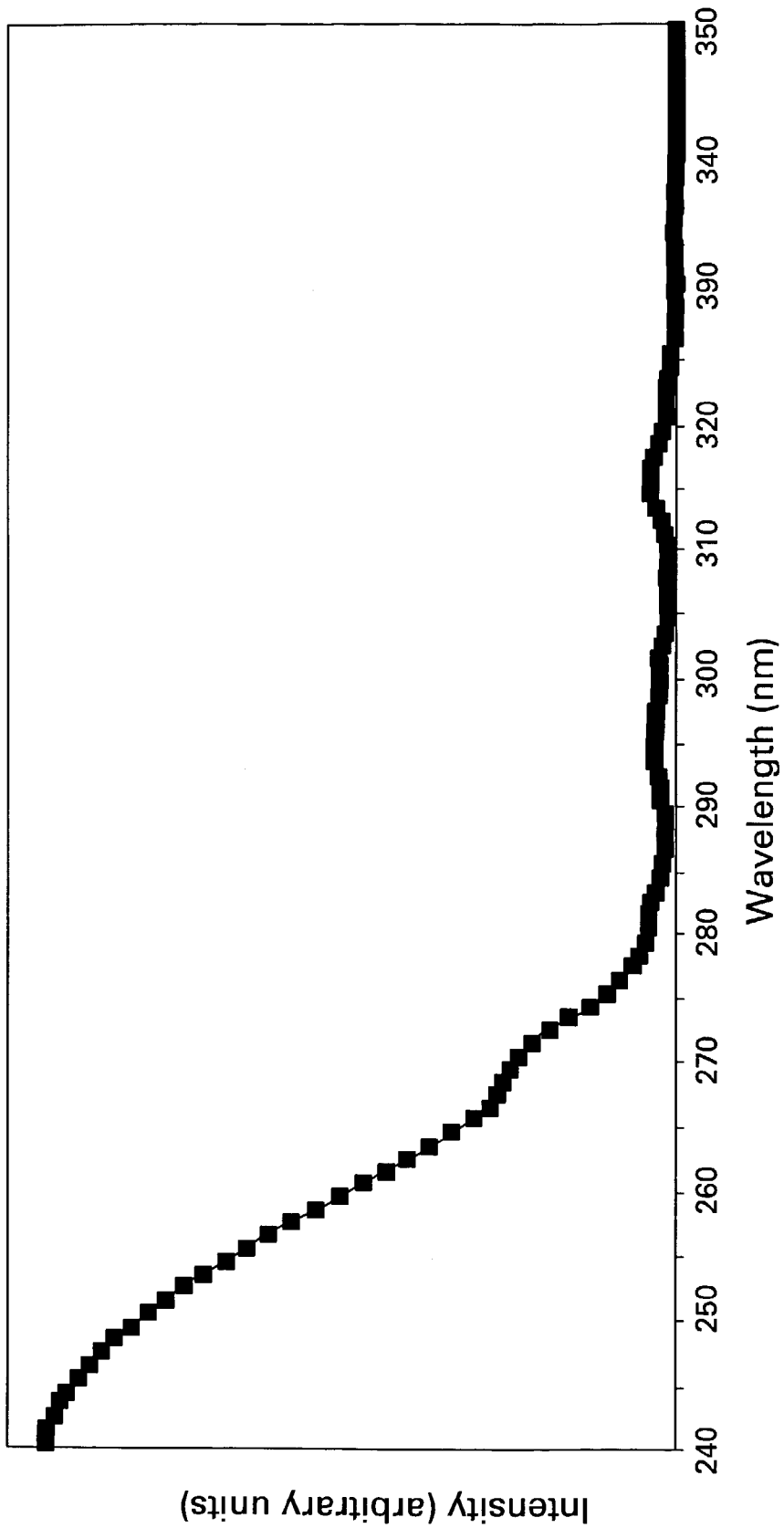
FIG. 2 shows the excitation spectrum of the phosphor having a formula of $BaGd_{0.7}Eu_{0.3}B_9O_{16}$.

Incorporation of a blend of phosphors that comprises a boron-containing red light-emitting phosphor of the present invention (as has been disclosed herein above), a green light-emitting phosphor, and a blue light-emitting phosphor in a mercury discharge device provides a white light-emitting device that can have a correlated color temperature ("CCT") in the range of 2500–10000 K, and a CRI in the range of 80–95. For example, a blend of phosphors consisting of $BaGd_{0.7}Eu_{0.3}B_9O_{16}$; $LaPO_4:Ce^{3+},Tb^{3+}$ (green light-emitting); $Sr_5(PO_4)_3(Cl,F,OH):Eu^{2+}$ (blue light-emitting); and $Sr_4Al_{14}O_{25}:Eu^{2+}$ (blue-green emitting) produces a composite spectrum shown in FIG. 2. The proportions of the individual phosphors are such that 32.1, 7.4, 18.8, and 41.7% of the composite spectrum are contributed by the phosphors $LaPO_4:Ce^{3+},Tb^{3+}$; $Sr_5(PO_4)_3(Cl,F,OH):Eu^{2+}$; $Sr_4Al_{14}O_{25}:Eu^{2+}$; and $BaGd_{0.7}Eu_{0.3}B_9O_{16}$; respectively. This phosphor blend produces white light having a CCT of 4000 K, a CRI of 92, and a luminous output of 320 lumen/W of radiant energy.

Non-limiting examples of other phosphors that may be used in a blend with a phosphor of the Present invention are $GdMgB_5O_{10}:Ce_{3+},Tb^{3+}$; $CeMgAl_{11}O_{19}:Ce_{3+},Tb^{3+}$; $BaMgAl_{10}O_{17}:Eu^{2+},Mn^{2+}$; $Ca_5(PO_4)_3(Cl,F,OH):Sb^+,Mn^{2+}$ $Eu_{2+}$; $Sr_4Al_{14}O_{25}:Eu^{2+}$; and $BaAl_8O_{13}:Eu^{2+}$; and combinations thereof.

Figure 3:
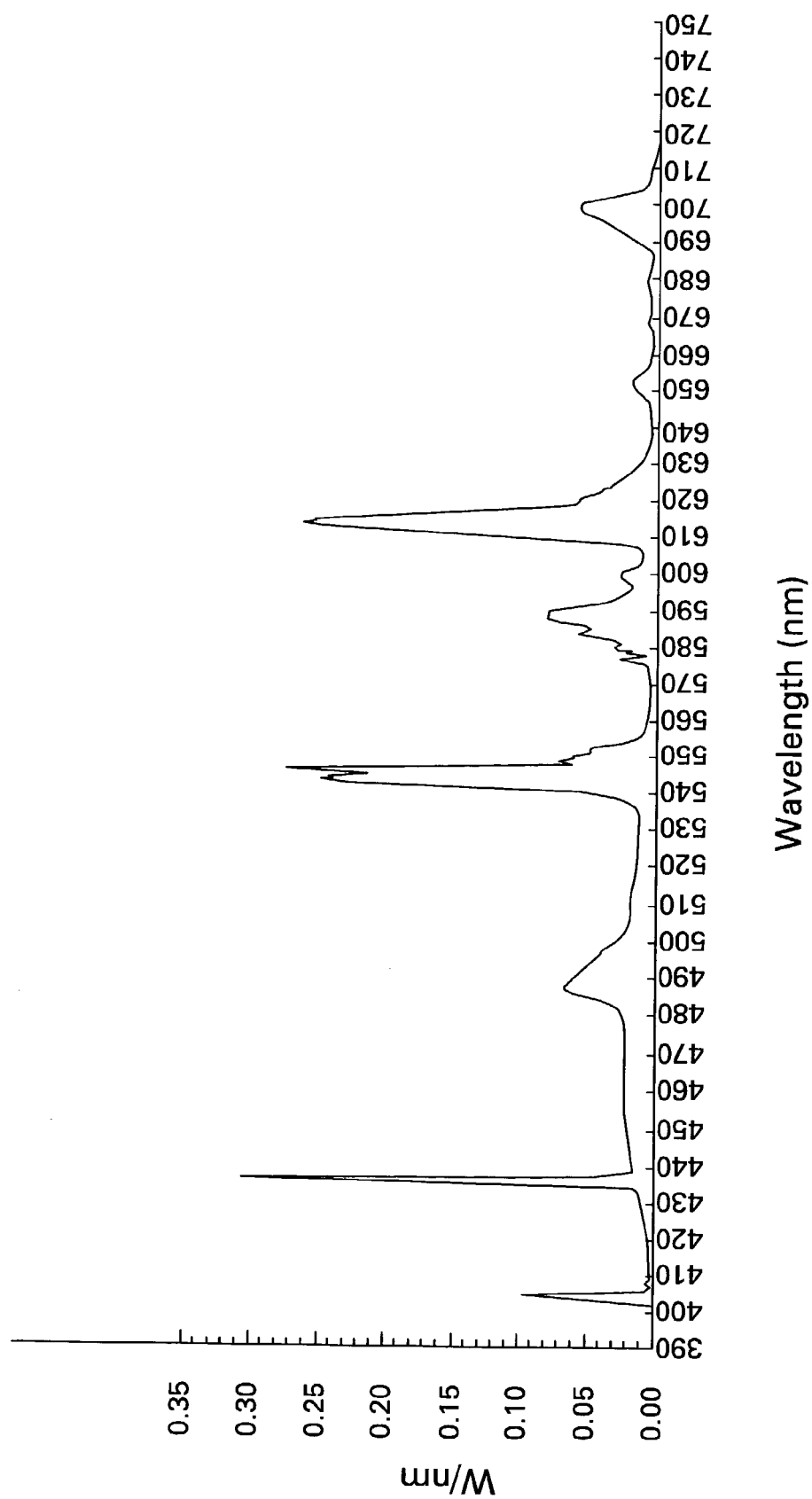
FIG. 3 shows a composite emission spectrum of a phosphor blend consisting of $BaGd_{0.7}Eu_{0.3}B_9O_{16}$; $LaPO_4:Ce^{3+}$, $Tb^{3+}$; $Sr_5(PO_4)_3(Cl,F,OH):Eu^{2+}$; and $Sr_4Al_{14}O_{25}: Eu^{2+}$.
Figure 4:
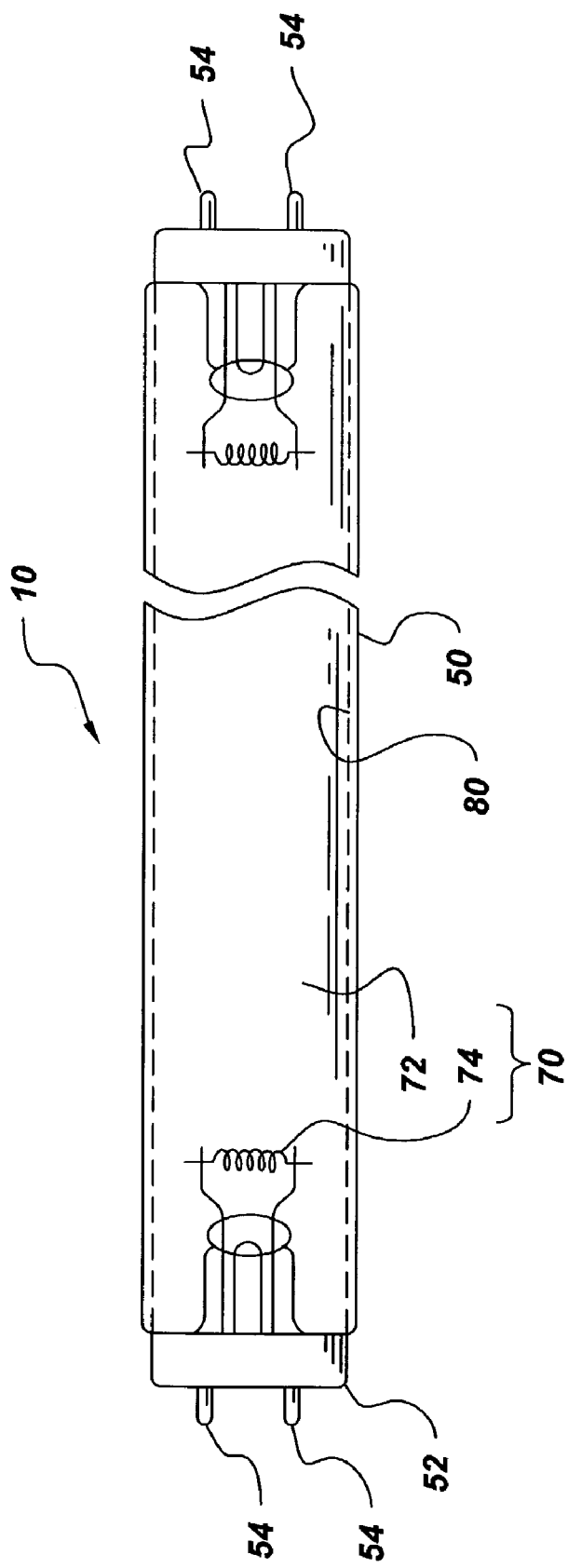
FIG. 4 shows schematically a light source that comprises a phosphor of the present invention.

Green light-emitting phosphors used in a phosphor blend of the present invention preferably emit light having a peak emission in the range from about 500 nm to about 560 nm. Blue light-emitting phosphors used in a phosphor blend of the present invention preferably emit light having a peak emission in the range from about 420 nm to about 500 nm. Red light-emitting phosphors, other than a phosphor of the present invention, can be used additionally in a phosphor blend. Such red light-emitting phosphors preferably emit light having a peak emission in the wavelength range from about 600 nm to about 625 nm. In one embodiment of the present invention, a light source 10, which produces white light with a high CRI suitable for general illumination (e.g., CRI in the range from about 80 to about 100), is shown in FIG. 3. Light source 10 comprises an evacuated sealed housing 50, a means 70 for generating UV radiation, which means is located within housing 50, and a phosphor blend 80 located within housing 50 and adapted to be excited by UV radiation. In one embodiment, light source 10 is a fluorescent lamp and evacuated housing 50 comprises an evacuated glass tube and associated end caps 52. In another embodiment, the phosphor blend is disposed on an inner surface of housing 50. Means 70 for generating UV radiation is a combination of a gas comprising a means 74 for generating high-energy electrons and a means 72 for absorbing the energy of the high-energy electrons. In one embodiment, means 72 for absorbing energy of high-energy electrons is a gas comprising mercury vapor, which absorbs energy of the high-energy electrons to create a mercury vapor discharge to excite the phosphor. In addition to mercury vapor, the gas can comprise an inert gas such as argon, krypton, or xenon. Means 74 for generating high-energy electrons may be a filament of a metal having a low work function (such as less than 4.5 eV), such as tungsten, or such a filament coated with alkaline earth metal oxides as are known in the art. Pins 54 are provided to supply electrical power to electron-generating means 74. The filament is coupled to a high-voltage source to generate electrons from the surface thereof. A phosphor of the present invention may be used in combination with other conventional phosphors used in fluorescent lighting technology. For example, a phosphor of the present invention may be combined with conventional red, green, and blue light-emitting phosphors, as disclosed herein above, to produce white light from a mercury discharge lamp. A particulate material comprising $TiO_2$ and/or $Al_2O_3$ can be used in conjunction with the phosphor blend to scatter light generated by light source 10. Such a light scattering material can be blended into the phosphor blend or disposed as a layer between the inner surface of housing 50 and phosphor layer 80. Although light source 10 shown in FIG. 3 comprises a straight housing 50, it should be understood that other housing shapes also are applicable. For example, a compact fluorescent lamp can have a housing that has one or more bends, and electrical supply pins 54 are disposed at one end of light source 10.

A boron-containing red light-emitting phosphor of the present invention also can be used as a component of a phosphor blend for cathode-ray tubes, which phosphor blend comprises blue light-emitting and green light-emitting phosphors. In this case, the high-energy electrons bombard a screen on which a coating of the phosphor blend is disposed to emit light in the visible spectral region.

While specific preferred embodiments of the present invention have been described in the foregoing, it will be appreciated by those skilled in the art that many modifications, substitutions, or variations may be made thereto without departing from the spirit and scope of the invention as defined in the appended claims.

What is claimed is:

1. A phosphor blend comprising $LaPO_4:Ce^{3+},Tb^{3+}$; $Sr_5(PO_4)_3(Cl,F,OH):Eu^{2+}$; $Sr_4Al_{14}O_{25}:Eu^{2+}$; and $BaGd_{0.7}Eu_{0.3}B_9O_{16}$.

2. A method for making a boron-containing phosphor, the method comprising:
   (a) providing a first solution that comprises:
      (1) barium carbonate, gadolinium oxide, europium oxide, boric acid, and lithium tetraborate;
   (b) adding a second solution to the first solution to produce a precipitate comprising barium, gadolinium, europium, and boron; the second solution comprising a base selected from the group consisting of ammonium hydroxide; hydroxides of at least one element selected from the group consisting of Ba, Sr, Ca, Mg, Gd, said at least a second element, and combinations thereof organic esters of carboxylic acids; organic amines; and combinations thereof and
   (c) heating the precipitate in an oxygen-containing atmosphere at a temperature in a range from about 900 C to about 1400 C for a time sufficient to convert the precipitate to the boron-containing phosphor having a formula of $BaGd_{0.7}Eu_{0.3}B_9O_{16}$.

3. A method for making a boron-containing phosphor, the method comprising:
   (a) providing a first solution that comprises:
      (1) at least a compound of at least a first element selected from the group consisting of Ba, Sr, Ca, Mg, and combinations thereof;
      (2) at least a compound of at least a second element selected from the group consisting of rare-earth metals other than europium;
      (3) at least a compound of europium; and
      (4) at least a compound of boron;
   (b) adding a second solution to the first solution to produce a precipitate comprising compounds of the first element, the second element, europium, and boron; the second solution comprising a base selected from the group consisting of ammonium hydroxide; hydroxides of at least one element selected from the group consisting of Ba, Sr, Ca, Mg, Gd, said at least a second element, and combinations thereof organic esters of carboxylic acids; organic amines; and combinations thereof; and
   (c) heating the precipitate in an oxygen-containing atmosphere at a temperature in a range from about 900 C to about 1400 C for a time sufficient to convert the precipitate to the boron-containing phosphor having a formula of $AD_{1-x}Eu_xB_9O_{16}$, wherein A is the at least a first element; D is the at least a second element; and x is in a range from about 0.005 to about 0.5.

4. The method according to claim 3, wherein the at least a compound of the first element, the at least a compound of the second element, the compound of europium, and the compound of boron comprise oxygen-containing compounds.

5. The method according to claim 4, wherein the oxygen containing compounds are dissolved in an acidic solution to form the first solution.

6. The method according to claim 3, wherein the organic esters are selected from the group consisting of methyl, ethyl, propyl esters of acetic acid, propionic acid, butyric acid, oxalic acid, malonic acid, succinic acid, and glutaric acid.

7. The method according to claim 3, wherein the organic amines are selected from the group consisting of methanolamine, ethanolamine, propanolamine, dimethanolamine, diethanolamine, dipropanolamine, trimethanolamine, triethanolamine, and tripropanolamine.

8. The method according to claim 3, wherein the heating temperature is in a range from about 900 C to about 1200 C.

9. The method according to claim 3, wherein the heating is carried out for a time in a range from about 1 minute to about 10 hours.

10. A light source comprising:
    (a) a source of UV radiation disposed in sealed housing, the UV source comprising a mercury vapor that is capable of absorbing energy of electron to create a mercury vapor discharge; and
    (b) a phosphor blend disposed on an inner surface of the sealed housing, the phosphor blend comprises a first phosphor having a formula of $LaPO_4:Ce^{3+},Tb^{3+}$; a second phosphor having a formula of $Sr_5(PO_4)_3(Cl,F,OH):Eu^{2+}$, a third phosphor having a formula of $Sr_5Al_{14}O_{25}:Eu^{2+}$, and a fourth phosphor having a formula of $BaGd_{0.7}Eu_{0.3}B_9O_{16}$; the phosphor blend absorbing UV radiation from the source of UV radiation and emitting light in a visible range.

11. A light source comprising:
    (a) a source of UV radiation disposed in sealed housing; and
    (b) a phosphor blend disposed on an inner surface of the sealed housing, the phosphor blend comprises a first phosphor having a formula of $LaPO_4:Ce^{3+},Tb^{3+}$; a second phosphor having a formula of $Sr_5(PO_4)_3(Cl,F,OH):Eu^{2+}$, a third phosphor having a formula of $Sr_4Al_{14}O_{25}:Eu^{2+}$, and a fourth phosphor having a formula of $BaGd_{0.7}Eu_{0.3}B_9O_{16}$; the phosphor blend absorbing UV radiation from the source of UV radiation and emitting light in a visible range.

* * * * *

UNITED STATES PATENT AND TRADEMARK OFFICE
CERTIFICATE OF CORRECTION

| | |
|---|---|
| PATENT NO. | : 7,019,452 B2 |
| APPLICATION NO. | : 10/448151 |
| DATED | : March 28, 2006 |
| INVENTOR(S) | : Alok Mani Srivastava, Holly Ann Comanzo and Venkatesan Manivannan |

Page 1 of 1

It is certified that error appears in the above-identified patent and that said Letters Patent is hereby corrected as shown below:

In Claim 10, column 8, line 47, change "a third phosphor having a formula of Sr5" with --a third phosphor having a formula of Sr4--.

Signed and Sealed this

Eighteenth Day of August, 2009

David J. Kappos
*Director of the United States Patent and Trademark Office*